United States Patent

[11] 3,585,399

[72] Inventor John R. Andrews, Jr.
Framingham, Mass.

[21] Appl. No. 771,155
[22] Filed Oct. 28, 1968
[45] Patented June 15, 1971
[73] Assignee Honeywell Inc.
Minneapolis, Minn.

[54] A TWO IMPEDANCE BRANCH TERMINATION NETWORK FOR INTERCONNECTING TWO SYSTEMS FOR BIDIRECTIONAL TRANSMISSION
15 Claims, 1 Drawing Fig.

[52] U.S. Cl. .......... 307/208, 307/270, 333/8, 333/32, 340/174
[51] Int. Cl. .......... H03k 19/08
[50] Field of Search .......... 307/208, 237, 238, 263, 268, 269, 270, 293; 328/55, 56; 333/8, 32, 33; 340/174 TL

[56] References Cited

UNITED STATES PATENTS

| | | | |
|---|---|---|---|
| 3,170,038 | 2/1965 | Johnson et al. | 307/208X |
| 3,302,035 | 1/1967 | Greene | 307/241 |
| 3,329,835 | 7/1967 | D'Agostino | 333/32X |
| 3,381,089 | 4/1968 | Delanoy et al. | 307/208X |
| 3,383,526 | 5/1968 | Berding | 307/208X |

*Primary Examiner*—Stanley D. Miller, Jr.
*Attorneys*—Fred Jacob and W. Hugo Liepmann

ABSTRACT: A low-noise, impedance-matching network consisting of two impedance branches interconnects two data processing systems of different constructions through a transmission line and provides a matched bidirectional interconnection therebetween. The transmission line connects to one digital system from a common point of the two-branch network, and transmit and receive parts of the second system connect to different branches of the network.

PATENTED JUN 15 1971 3,585,399
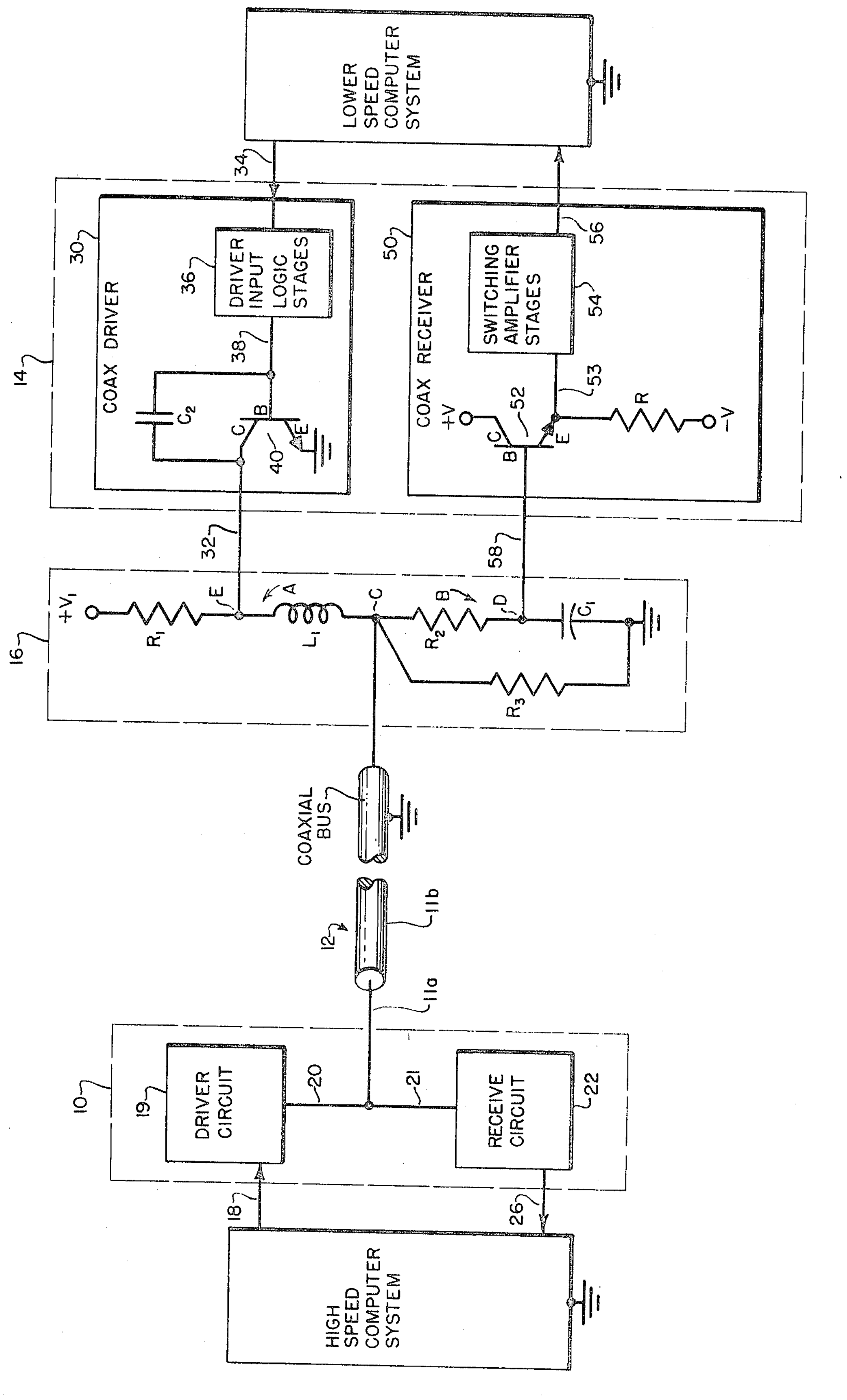

A TWO IMPEDANCE BRANCH TERMINATION NETWORK FOR INTERCONNECTING TWO SYSTEMS FOR BIDIRECTIONAL TRANSMISSION

BACKGROUND OF THE INVENTION

This invention relates to digital pulse transmission systems. More particularly, it provides circuitry for both minimizing reflections, and minimizing the introduction of noise into the circuitry of a first data processing system which is connected for bidirectional communication with a second data processing system which is connected for bidirectional communication with a second gate Processing system. The invention is particularly useful in interconnecting data processing systems constructed to operate at different speeds, i.e. with digital pulses of different rise and/or fall times.

The avoidance of cross talk and reflections in the interconnection of computer systems or portions thereof has been a common problem, particularly where the interconnections involve coupling high speed signals. This arises because pulse signals having fast (nanosecond) rise times, with frequency components in the hundreds of megahertz, cause short lengths of interconnecting wires to act as transmission lines.

Further, the effect of reflections becomes more noticeable where high-speed circuitry is concerned. Reflections are caused by terminating a signal line with an impedance not matched to the line. Since high-speed circuits operate with signals having short rise times, reflections are sharp and tend to add and subtract appreciably from the magnitude of input signal. Consequently, for many high-speed applications, a well matched transmission line system is the best choice.

The foregoing problems concerning crosstalk and reflections are compounded when digital systems constructed to handle pulses normally having slower rise times are connected to receive pulses having materially shorter (i.e. faster) rise times This situation can arise when there is an advance in construction technology directed toward increasing packing density and the resultant new computer systems constructed with the higher package density are connected to existing computer systems constructed utilizing prior techniques. This very problem arises, for example, when a new system constructed with integrated circuit subunits is connected with an existing system constructed with discrete components.

In particular, the integrated circuit construction commonly employs multilayer printed circuit boards to connect the integrated circuit subunits in the system. Where these boards have a ground plane, as is known, the printed circuit paths thereon operate as transmission lines with a uniform characteristic impedance. Also, the ground plane shields noise signals, which is desirable. These features enable the system constructed in this manner to operate with high-speed signals, i.e. with pulses having short rise and/or fall times.

In contrast, the digital system constructed with discrete components typically involves single layer printed circuit boards and open wire interconnections. These interconnections are seldom of uniform impedance and commonly are subject to considerable intercoupling, resulting in crosstalk and other electrical disturbances.

In the prior art, transformers having a selected number of turns in each winding having been used to match impedances in bidirectional signal paths. However, this construction is costly and more importantly does not slope control the input pulses applied thereto.

Another known impedance-matching technique employs an active amplifying element, commonly a transistor, in series with passive elements of selected impedance. However, changes in the active element conductance generally alter the overall impedance of such a circuit, so that it provides a true impedance match only under limited operating conditions. Further, any noise signals applied at the input of the circuit are amplified and coupled therethrough with the desired information signals.

Accordingly, it is an object of the present invention to provide a bidirectional digital termination circuit for interconnecting digital systems with essentially minimal introduction of noise.

Another object of the invention is to provide a bidirectional digital termination circuit for providing a matched interconnection between digital systems.

A further object of the invention is to provide a circuit of the above character that is inexpensive to manufacture and is compact.

A still further object of the invention is to provide a low cost termination circuit that enables conventional digital transmit and receive circuitry to be interconnected for matched bidirectional transmission.

It is also an object of the present invention to provide a bidirectional digital-coupling circuit of the above character for interconnecting digital systems employing different packaging constructions so as to have unmatched signal paths therein.

Other objects of the invention will in part be obvious and will in part appear hereinafter.

SUMMARY OF THE INVENTION

In brief, the invention provides a two impedance branch termination network for connecting the transmit and receive circuitry of a first data processing device or system to a transmission line connected at its other end to another second data processing device or system. A first impedance branch of the network connects the transmit circuitry of the second system to the transmission line with no significant signal attenuation. A second branch of the network connects the receive circuitry of the second system to the transmission line.

In practice, the second digital system generally operates at a slower speed, i.e. with pulses having longer rise and/or fall times, than the first digital system.

In operation, the first branch presents a low resistive path to pulses generated by the transmit circuitry applied to the transmission line. Additionally, the first branch provides an impedance which combines with the impedance of the second branch to terminate the transmission line in its characteristic impedance.

In addition, the second branch of the termination network controls the slope or rise time of fast rise-time signals applied thereto from the transmission line by removing the higher frequency components thereof. This eliminates the coupling of noise signals from the transmission line through the receive circuitry of the second computer system in addition to removing high frequency components of pulses generated by the transmit circuitry.

Moreover, the impedances of the two branches combine to terminate the transmission line in its characteristic impedance.

With this arrangement, the termination network interconnects the two systems without reflections and crosstalk.

The invention accordingly comprises the features of construction, combination of elements, and arrangement of parts exemplified in the construction hereinafter set forth, and the scope of the invention is indicated in the claims.

BRIEF DESCRIPTION OF THE DRAWING

For a fuller understanding of the nature and object of the invention, reference should be had to the following detailed description taken in connection with the accompanying drawing, which is a diagrammatic illustration of two digital systems interconnected with a bidirectional transmission line in accordance with the invention.

DESCRIPTION OF PREFERRED EMBODIMENT

With reference to the drawing, the interconnection in a digital data processing arrangement of a first high-speed computer system (indicated on the left) to a second lower speed computer system (indicated on the right) employs the successive arrangement of a transmit and receive unit 10 coupled with the first system, a coaxial transmission bus 12, a termination network 16, and a transmit and receive unit 14 connected, in turn, to the second system.

The illustrated transmit-receive unit 10 has a drive circuit 19 connected at an input terminal 18 to receive logic signals, e.g. binary ONES and ZEROS, from the high-speed data processing system. An output terminal 20 of the drive circuit is connected to an inner conductor 11*a* of the coaxial bus 12; the outer conductor 11*b* is connected to a common return path illustrated as ground.

A receive circuit 22 in the unit 10 has an input terminal 21 connected to the conductor 11*a* in common with the output terminal 20 of the driver circuit 19. An output terminal 26 of the receive circuit 22 is connected as an input to the high-speed data processing system.

Both the drive circuit 19 and the receive circuit 22 can employ any well-known construction operative respectively to transmit fast rise time digital pulses in response to logic signals applied at the input thereof, and to convert digital pulsed applied thereto into corresponding logic signals. For example, the drive circuit 19 can comprise switching logic formed with transistor-transistor logic gates (TTL) of the type described in the text of J. Millman and H. Taub entitled "Pulse, Digital and switching Waveforms," McGraw-Hill Book Company, 1965. In an illustrative preferred embodiment, the drive circuit 19 generates digital pulses having transition or rise times under 5 nanoseconds.

Similarly, the receive circuit 22 can comprise a conventional pulse amplifier constructed with emitter followers and logic switches of a type disclosed in the aforementioned text.

Although not shown, it will be appreciated that the junction formed by the terminals 20 and 21 connects to a network which terminates the coaxial bus in its characteristic impedance. The aforementioned network may comprise a resistance connected to a DC supply voltage.

For the purpose of further illustration, in the ensuing discussion, both the drive and receive circuits 19 and 22 respectively are assumed to be constructed with integrated techniques and high density packaging. The interconnections for the high density packaging in the contemplated arrangement characteristically utilize multilayer printed circuit boards to provide controlled impedances. This assures the interconnection paths have uniform transmission characteristics. Consequently, these arrangements eliminate the need for additional components for terminating interconnecting signal lines. There need only be an appropriate termination resistance in series with the remote end of the coaxial bus for terminating the bus in its characteristic impedance. Examples of such interconnection arrangements for the bus are described in the publication by Rogers Publishing Company Inc. titled "Advances in Electronic Circuit Packaging"—Proceedings of the Sixth international Electronic Circuit-Packaging Symposium Aug. 1965.

With further reference to the drawing, the termination network 16 has a first impedance branch A formed with an inductive element L1 in series at a junction (E) with a resistive element R1. A second impedance branch B of the network 16 has a resistive element R2 in series at a junction (D) with a reactive element C1. The element L1 of branch A and the element R1 of branch B are connected together at junction (C) to which is connected the end of inner conductor 11*a* remote from the unit 10. Further, the resistive end of branch a is connected to a positive direct voltage ($+V_1$), and the reactive, i.e. capacitive, end of branch B is connected to the ground return conductor.

The illustrated termination network 16 further includes a resistive element R3 connected between junction (C) and ground.

The transmit and receive unit 14 includes a coaxial driver 30 and a coaxial receiver 50. The driver 30 has an input terminal 34 connected to receive logic signals from the lower speed computer system and an output terminal 32 connected to the junction (E) of the network 16 for coupling to the bus 12 through the element L1. Within the driver 30, input gate buffer logic stages 36 receive the logic signals from terminal 34. The output from the stage 36 is applied to a terminal 38 which, in turn, is connected to the base of a common emitter transistor 40 having a Miller capacitor C2 connected between the base and collector. The transistor collector is further connected to the output terminal 32 of the driver; the transistor emitter is grounded.

Turning to the receiver 50, it has an input terminal 58 connected to the network junction (D) for coupling to the coaxial bus 12 through resistor R2. Input signals thus received from the bus are applied to the base of a transistor 52 arranged in an emitter follower or common collector configuration to operate as an amplifier with high input impedance. The transistor collector is connected to a supply of positive direct voltage (+V) and a resistor R is connected between the emitter and a supply of negative direct voltage (−V). The emitter is further connected to a terminal 53 feeding switching amplifier stages 54 that drive the receiver output terminal 56 which in turn is connected to the lower speed computer system.

The drawing illustrates in terms of signal flow the interconnection of the various portions of the preferred embodiment. Now considering the embodiment from a slightly different aspect, i.e. system design construction, the left end of the coaxial bus 12 connects to a set of pin connectors of a multilayer board on which the driver circuit 19 and the receive circuit 22 are mounted. The right end of the coaxial bus 12 connects to a circuit board on which is mounted the discrete components of the termination network 16. The connection corresponds electrically to the junction C of the network 16. Wires from the termination circuit board interconnect the outputs E and D of the network 16 to the back panel or backboard of the lower speed system. From the backboard, these wires from outputs E and D are connected to the transmit and receive ports 32 and 58 respectively. The ports 32 and 58 correspond to pin connections of the circuit board on which the transmit and receive circuits are mounted.

As mentioned previously, the multilayer board construction of the high-speed system approximates a well matched transmission path; therefore, a direct line connection from the junction formed by the terminals 20 and 21 through a resistive network (not shown) is all that is required to match the characteristic impedance of the bus.

The positioning of the termination network 16 before the transmit and receive ports of the lower speed isolates the wires (i.e. port terminals 32 and 58) of the system backboard from noise signals. By providing immediate termination of the coaxial bus 12, any high frequency noise disturbances external to the system are absorbed by the network 16 thereby prevented from entering other portions of the system. And, more importantly, the slopes (rise time and fall time) of the digital pulses received are controlled. Because the rise and/or fall times (slopes) of the digital pulses are controlled by an intentional slowing down of the pulse waveform prior to transfer through any open wire connection points, noise generation (i.e. crosstalk) is significantly reduced. Further, noise signals which are generated by other sources and coupled to the receive part are directly absorbed by the capacitor C1 of branch B of the network 16.

If the network 16 were constructed to include only resistive elements, rather than both resistive and reactive elements, the rise times and fall times of the digital pulses would remain uncontrolled. These pulses traveling through open wire connection points would create noise in the form of ringing disturbances and crosstalk would be radiated to other portions of the backboard wiring of the lower speed system. However, the present construction avoids these problems.

DESCRIPTION OF OPERATION

Considering the operation of the bidirectional system in greater detail, a logical signal, e.g. binary ONE, applied from the lower speed computer system to terminal 34 is amplified by the driver input logic stages 36. The amplified logic signal is applied from the output 38 to the base of the normally nonconductive driver transistor 40, switching it into saturation. When the driver transistor 40 is nonconductive, the voltage level applied to the inner conductor 11*a* i.e. junction (C) of the bus 12 approximates the positive direct supply voltage, $+V_1$. The reason for differences in magnitude between the voltage applied at the junction C and the supply voltage$+V_1$ are explained below.

Switching the transistor 40 into saturation drops the voltage level at the collector to zero volts or ground potential. The reactive element of $L_1$ provides a low resistance path between the junction (C) and the terminal 32 and hence the junction (C) is switched between the Thevenized supply voltage ($+V_1$) and the near-zero collector voltage of the saturated transistor 40. Slope control of the logical signals transferred from the low speed system is provided through the collector to base capacitor C2. Specifically, the capacitor decreases the rate of change of voltage and current at the collector of transistor 40 during its switching time, and thereby diminishes the noise signals otherwise generated during switching. Therefore, noise signals from the transmit port 32 are not radiated onto the backboard wiring of the lower speed system. The reactive element $L_1$ slightly lengthens rise time from the output slow rise pulse waveform thereby also further reducing noise generation.

In summary, the low resistance portion (I.e. $L_1$) of the branch A of the network 16 is effective during a transmit operation to provide an output pulse whose magnitude approximates the DC supply voltage $+V_1$ of the driver circuit 30.

The output pulse waveform appearing at junction (C) is transmitted along the coaxial bus 12 without degradation and appears as an input to the receive port 21 of the high-speed computer system. The cross talk and common mode noise rejection qualities of the coaxial bus 12 permit a pulse transfer without degradation. The junction formed by the terminals 20 and 21 presents a matched impedance to the coaxial bus 12. The pulse signals from the lower speed system applied to the terminal 21 are converted by receive circuit 22 into fast rise time logical signals. The signals are transferred to the pertinent portions of the high-speed data processing system.

Considering transmission in the opposite direction, i.e. from left to right in the drawing, fast rise time digital pulses with rise times of 5 nanoseconds or less are generated by the driver circuit 19 in response to logic signals applied from the high-speed computer system on the terminal 18. The coaxial bus 12 transmits digital pulses with essentially no attenuation to junction (C) of the termination network 16. These signals pass through the impedance branch B to the receive port, i.e. terminal 58, of the receiver 50. The impedance branch B lengthens or slows down sufficiently the fast rise times of the digital pulses to be compatible with the rise and/or fall times of the lower speed system. This lengthening of the pulse rise times reduces significantly the generation of noise signals; also the capacitor $C_2$ of the branch absorbs noise disturbances thereby preventing them from entering system and being amplified by stages 54.

Several important factors must be considered when selecting particular values for the components of the network 16. First, the coaxial bus 12 must be terminated in its characteristic impedance, ZO, in order to eliminate reflections. Secondly, the components must be selected to provide the appropriate degree of slope control to the incoming fast rise time pulses in addition to minimizing the total pulse delay through the network 16. More specifically, values for $L_1/R_1$ and $R_2C_2$ for the impedance branches A and B respectively of the Figure are selected to have a time constant compatible with the maximum slope (i.e. shortest rise time) of the pulses handled by the lower speed system.

Values for the components of the network 16 are selected as follows. For simplicity in analysis, first consider the termination network 16 with resistance $R_3$ eliminated. The impedance $Z_{in}$ at the junction (C) corresponds to the sum of the impedance of branches A and B taken in parallel. If $R_1=R_2$ its value is given by the expression: $Z_{in}=R_1(S+W_1/S+W_2)$ where $W_1=L_1/R_1$, $W_2=R_2C_1$. By making $W_1$equal $W_2$, the impedance, $Z_{in}$, becomes totally resistive. More specifically, if $L_1/R_1=R_2C_2$ and $R_1=R_2$, then in the above expression: $Z_{in}=R_1(S+W_1/S+W_2)$ where $W_1=L_1/R_1$, $W_2=R_2C_1$. By making $W_1$ equal $W_2$, the impedance, $Z_{in}$, becomes totally resistive. More specifically, if $L_1/R_1=R_2C_2$ and $R_1=R_2$, then in the above expression: $Z_{in}=R_1$.

Now considering the network 16 with the resistance $R_3$ included in parallel with the impedance of branches A and B, the input impedance $Z_{in}$ is given by the expression $Z_{in}=R_1R_3/R_1+R_3$. in order for the line to be properly terminated in its characteristic impedance, $Z_0$; $R_1R_3/R_1+R_3$ must be made to equal $Z_0$. Additionally, when $R_3$ is connected as shown it reduces the magnitude of line voltage applied to the driver circuit 19 (i.e. the magnitude positive supply voltage ($+V_1$) applied to the junction (C). This has the overall effect of reducing the power constraints on the transmit-receive circuitry 10 of the high-speed computer system. By selecting an appropriate value for line voltage (i.e. voltage at junction (C), the ratio $R_1/R_3$ is established. More specifically, the magnitude of voltage at the junction (C), is derived by calculating the Thevenin voltage at the junction (C). Those not familiar with this calculation should referred to the text of R.C. Scott entitled "Linear Circuits" Addison-Wesley Publishing Company, Inc. 1960.

The values of $R_1$ and $R_3$ may be then derived utilizing the two relationships given above.

As mentioned previously, the lower speed system, in particular the logic circuits included therein handle digital pulses with rise times and fall times no shorter than 20 nanoseconds. In the preferred embodiment, the slope $DV/DT$ of the digital pulses generated by the logic circuitry does not exceed one-fifth volt/nanoseconds i.e. there is a 4 volt change in pulse amplitude during the 20 nanosecond interval. Consequently, the rate of change per volt $DT/DV$, corresponds to 5 nanoseconds per volt. This rate of change is used in calculating the values for the time constants $L_1/R_1$ and $R_2C_2$ of the branches A and B respectively. More specifically, the values for the components $L_1$, $R_2$ and $R_2C_2$ are selected so that the rate of change of voltage at the transmit and receive ports does not exceed 5 nanoseconds per volt. The values for components $R_2C_1$ are derived in accordance with the expression $DV/DT=V/R_2C_1$ where $V$=maximum value of line voltage and $DV/DT$=5 nanoseconds/volt. Since $L_1/R_1=R_2C_1$, the value for $L_1$ is easily derived.

By way of illustration, the components of the termination network 16 of an embodiment for a coaxial bus having a characteristic impedance, $Z_0$, of 75 ohms are listed below. The components selected permit transfer of fast rise time pulses to a lower speed system which handles pulses with rise times typically 5 nanoseconds per volt.

$+V_1$=5 volts $R_1, R_2$=91 ohms $C_1$=270 picofarads $L_1$=2.2 microhenries $R_3$ (optional) =510 ohms With $R_3$ having the value listed above, the voltage and impedance to ground at junction (C) are +4.5 volts and 75 ohms respectively. As mentioned previously, these values are derived by calculating the Thevenin equivalent of the network 16 with the values given above.

In summary, the invention provides a novel termination network which can be connected with conventional transmit and receive circuitry of the computer system. Moreover, this circuitry does not require modification when connected with the present network. The network (1) terminates the transmission line in its characteristic impedance thereby preventing reflections, (2) absorbs high frequency noise disturbances picked up in the lower speed system and (3) slows down the input and output digital pulse waveforms, thereby significantly reducing the generation of noise signals. The foregoing is accomplished utilizing relatively few components in addition to the conventional circuitry with which it is connected.

In practice, the invention can be used with changes from the illustrated embodiment. For example, other types of driver and receive circuits can be connected to the network 16, and polarities of voltage sources and transistors can be changed. Further, the elements of each of the network are not limited to a particular value (i.e. changed to be compatible with the rise times of different systems) and can be selected to terminate coaxial lines having different characteristic impedances. Also, the resistance $R_3$ can be eliminated from the termination network 16 and the values or $R_1$ and $R_2$ modified to have a resistive value approximating the characteristic impedance of the transmission line.

While in accordance with the provisions and statutes there has been illustrated and described the best form of the invention known, certain changes may be made in the circuitry described without departing from the spirit of the invention as set forth in the appended claims and that in some cases, certain features of the invention may be used to advantage without a corresponding use of other features.

Having described the invention, what I claim as new and novel and for which it is desired to secure Letters Patent is:

1. A termination network for connecting a data processing system having separate transmit and receive ports to a second system for bidirectional transmission of digital pulses over a transmission bus, said termination network comprising:

a first impedance branch connecting said bus to said transmit port;

a second impedance branch connected to form a common junction with said first impedance branch and connecting said bus to said receive port; the impedances of said first and second impedance branches being selected to have a value when combined in parallel to terminate the bus resistively in its characteristic impedance so as to prevent reflections during said transmission of said digital pulses

2. In a transmission bus system for interconnecting first and second data processing systems of different construction for bidirectional transmission of digital pulses wherein said transmission system comprises first transmit and receive circuit means, second transmit and receive circuit means, said first transmit and receive means connecting said first data processing system to one end of said bus, said second transmit and receive circuit means connecting said second data processing system to the other end of said bus, said system further including a termination network means, said network means connected between one end of said transmission bus and said second transmit and receive means, said network means comprising:

a first impedance branch, said first impedance branch connected between said transmission bus and said second transmit circuit; a second impedance branch, said second impedance branch connected between said bus in common with said first impedance branch and said second receiving circuit means;

said first and second impedance branches each comprising a plurality of elements selected to have predetermined impedance values whereby the total impedance of both said branches combined terminate said bus resistively in its characteristic impedance.

3. Apparatus of claim 2 wherein the elements of said first and second impedance branches include a resistive element and a reactive element respectively, said elements of at least one of said branches selected to have a time constant of a value compatible with the slopes of digital pulses processed by said second data processing system whereby said branch applies a predetermined amount of slope correction to pulses transferred thereto.

4. Apparatus of claim 3 wherein said second receive circuit means includes an input terminal and an output terminal, said input terminal connected across a predetermined portion of said second impedance branch which slows down or lengthens rise times of fast rise time digital pulses applied to said bus and absorbs the high frequency components of said digital pulses thereby preventing the generation and transfer of noise signals to said input terminal of said receive circuit means.

5. Apparatus of claim 3 wherein said second transmit circuit means has an input terminal and an output terminal, said output terminal connected through a low resistance portion of said first impedance branch, said transmit circuit connected to be switched in accordance with logical signals applied to said input terminal to produce digital pulse signals at said output terminal which are applied to said transmission bus.

6 The apparatus of claim 4 wherein said transmit circuit includes a driving transistor, said transistor being connected in a common emitter configuration; slope control means connected across said transistor in a manner to cause said transistor to switch at a slower rate thereby producing a corresponding slowing down of the rise time of each of said digital pulses transferred to said output terminal.

7. Apparatus of claim 6 wherein said slope control means constitutes a capacitor.

8. Apparatus of claim 3 wherein the reactive element of said first branch is inductive and the reactive element of said second branch is capacitive.

9. Apparatus of claim 3 wherein each impedance branch has a single resistive element having a value equaling the characteristic impedance of said transmission bus.

10. A transmission line termination network for resistively terminating a transmission bus in its characteristic impedance and for individually connecting transmit circuit means and receive circuit means respectively of a data processing system to said transmission bus for transmitting and receiving digital pulse respectively, said termination network comprising:

a first impedance branch connected at one end to said transmission line and at the other end to a voltage source;

a second impedance branch connected in common at one end to form a junction with said transmission bus and said first impedance branch, said second impedance branch connected at the other end to a source of reference potential;

receive circuit means connected at a predetermined point to said first impedance branch;

said transmit circuit means connected to a predetermined point in said second impedance branch;

said first and second impedance branches each comprising a plurality of elements, the elements of said first impedance branch selected to have a time constant compatible with the rise times of digital logic signals handled by said system for providing a predetermined amount of slope control to fast rise time digital pulses before application to said receiving circuit means and said elements of said second branch connected to provide a low resistance path to said transmission bus for pulse signals generated by said transmit circuit means and said elements of said branches further selected to provide an impedance at said common junction for the combined impedances of said first and second impedance branches which approximates the characteristic impedance of said transmission bus.

11. Apparatus of claim 9 wherein said termination network further includes resistive means connected between said common junction and said reference potential for decreasing the voltage at said common junction, said resistive means and impedance of said branches selected to have values which when combined have a resistance which approximates said characteristic impedance of said bus.

12. The network of claim 10 wherein said impedance at said common junction is given by the relationship $Z_{in}={}_1$where $W_1={}_1/R_1$, $W_2=R_2C_1$, said elements of said first impedance branch including series connected inductor$L_1$ and resistor $R_1$ and said elements of said second impedance branch includes series connected capacitor $C_1$ and resistor $R_2$, said values for $L_1$, $R_1$ and $R_2$, $C_1$ being selected to have $Z_{in}=R_1$ and to provide a predetermined rate of change in said rise times of said signals at said common junction.

13. The network of claim 12 wherein $R_1$ has a value which approximates and characteristic impedance.

14. The network of claim 12 wherein said impedance at said common junction $Z_{in}$ further includes a resistor R3 connected between said common point and said source of reference potential whereby said impedance $Z_{in}$ is now given by the relationship $Z_{in}=(R_1R_3)/(R_1R_3)$.

15. The network of claim 14 wherein $R_1$ and $R_3$ are selected to have values for terminating said bus in its characteristic impedance and for reducing the magnitude of said voltage source by a predetermined amount.

UNITED STATES PATENT OFFICE
CERTIFICATE OF CORRECTION

Patent No. 3,585,399 Dated June 15, 1971

Inventor(s) John R. Andrews, Jr.

It is certified that error appears in the above-identified patent and that said Letters Patent are hereby corrected as shown below:

Column 9, line 2, after "relationship" cancel "$Z_{in}=1$" and -- Zin = R1[(S + W1)/(S + W2)] --; line 11, "and" should read -- said --. Column 10, line 5, "/(R1 R3)" should read -- /(R1 + R3) --.

Signed and sealed thjs 23rd day of May 1972.

(SEAL)
Attest:

EDWARD M.FLETCHER,JR.
Attesting Officer

ROBERT GOTTSCHALK
Commissioner of Patents